(No Model.)

M. P. CAMPBELL.
TOOTHED GEARING.

No. 456,796. Patented July 28, 1891.

WITNESSES:
W. R. Davis.
C. Sedgwick

INVENTOR:
M. P. Campbell
BY Munn & Co.
ATTORNEYS

UNITED STATES PATENT OFFICE.

MATTHEW P. CAMPBELL, OF GLASGOW, SCOTLAND, ASSIGNOR TO HIMSELF AND JAMES RUTHERFORD, OF SPOKANE FALLS, WASHINGTON.

TOOTHED GEARING.

SPECIFICATION forming part of Letters Patent No. 456,796, dated July 28, 1891.

Application filed December 20, 1890. Serial No. 375,381. (No model.) Patented in England, September 25, 1885, No. 11,434.

*To all whom it may concern:*

Be it known that I, MATTHEW PETTIGREW CAMPBELL, of Glasgow, Scotland, have invented a new and useful Improvement in Toothed Gearing, (for which I have obtained Letters Patent of Great Britain, No. 11,434, dated September 25, 1885,) of which the following is a full, clear, and exact description.

The object of the invention is to provide certain new and useful improvements in toothed gearing, principally adapted for the transmission of great power, and more especially designed for use on worm-wheels and worms, the teeth of the worm-wheel being arranged so as to vary their angular position to permit of meshing with worms or screws of varying or different pitch or thread.

The invention consists of certain parts and details and combinations of the same, as will be hereinafter fully described, and then pointed out in the claims.

Reference is to be had to the accompanying drawings, forming a part of this specification, in which similar letters of reference indicate corresponding parts in both the figures.

Figure 1:
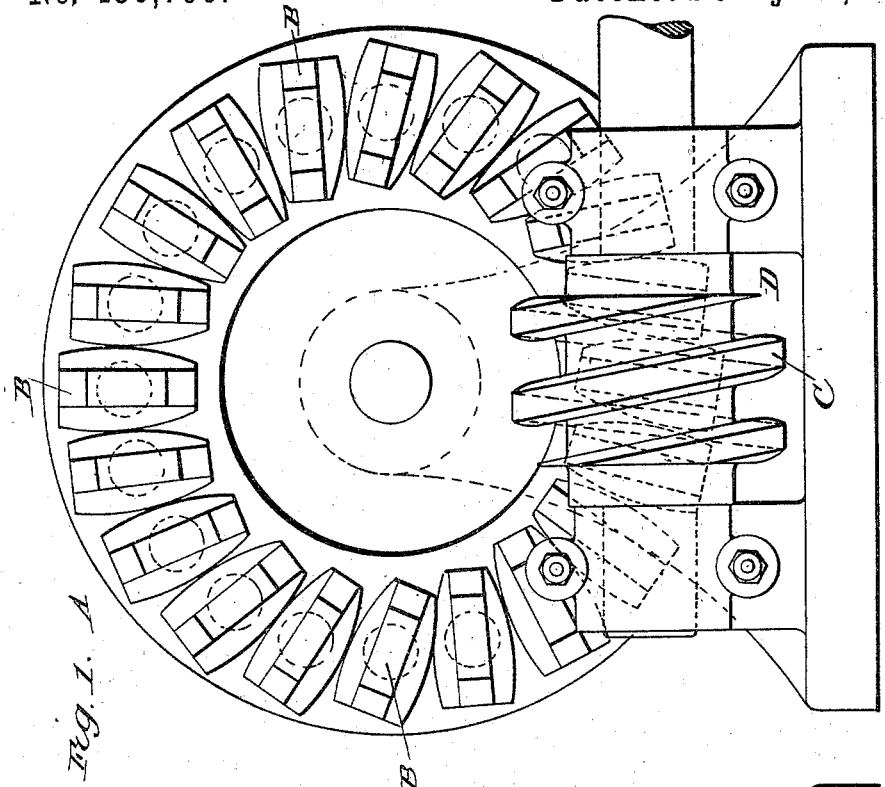
Figure 2:
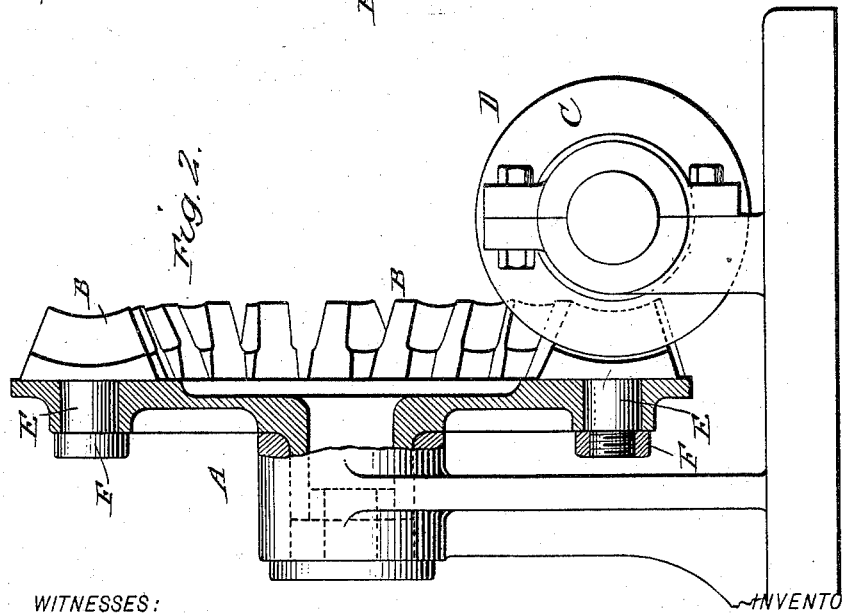

Figure 1 is a face view of the improvement; and Fig. 2 is a side elevation of the same, parts being in section.

The gear-wheel A is provided on the face of its rim with teeth B, adapted to mesh into the thread C of the worm D. The teeth B are each provided with a pivot-pin E, fitted to turn in the rim of the wheel A, and retained in place by a collar or nut F, or other similar devices, so as to retain the teeth on the face of the rim, at the same time permitting them to turn. Each tooth B is free to oscillate on its pivot-pin E, so that while the pitch or actual distance from center to center of the teeth remains constant the teeth adapt themselves by swiveling on their pivots to the inclination of the screw or worm D, with which they gear, when screws or worms of varying pitch or different screws having unequal pitch, are arranged to gear with the toothed wheel. The swiveling teeth B are, by preference, enlarged or formed with shoulders near their roots, bearing against each other, as is shown, so as to distribute the strain throughout the series of cogs or teeth B.

The invention, though only represented as applied to the bevel form of worm-wheel, is equally applicable to other forms, the teeth being fitted with their securing pivot-pins passing radially through the rim of the wheel or through the side of the rim parallel or at an inclination to the axis of the wheel, as circumstances may require. The pivot-pins may be passed through a row of holes arranged in a circle round the wheel-rim, or two rows of staggered holes may be formed in the rim, so that the alternate teeth may be pivoted in the outer circle of holes and the others in the inner circle.

Having thus fully described my invention, I claim as new and desire to secure by Letters Patent—

1. A gear-wheel having angular pivoted teeth free to oscillate on their pivots, the distance of the teeth from center to center being constant, while their inclination may be varied to accord with screws or worms of varying pitch, substantially as set forth.

2. A gear-wheel having pivoted teeth and enlarged roots adapted to bear against each other, substantially as shown and described.

MATTHEW P. CAMPBELL.

Witnesses:
JOHN GARDNER,
JAMES GARDNER.